United States Patent [19]

Rosen

[11] Patent Number: 5,709,360
[45] Date of Patent: Jan. 20, 1998

[54] RATCHETING ARTICULABLE MONITOR SUPPORT AND PRESENTATION DEVICE

[76] Inventor: John B. Rosen, 87580 Cherry Ridge Rd., Eugene, Oreg. 97402

[21] Appl. No.: 315,819

[22] Filed: Sep. 30, 1994

[51] Int. Cl.⁶ .................................................. E04G 3/00
[52] U.S. Cl. ........................ 248/278.1; 248/921; 403/59; 403/97
[58] Field of Search ........................... 248/279.1, 278.1, 248/917, 919, 920, 921, 922, 923, 276.1, 184, 442.2, 447; 403/97, 60, 59, 61

[56] References Cited

U.S. PATENT DOCUMENTS

| 120,329 | 10/1871 | Rosenthal | 248/278 |
|---|---|---|---|
| D. 340,235 | 10/1993 | Robak et al. | |
| 510,323 | 12/1893 | Brammer | 248/279 |
| 1,948,789 | 2/1934 | Goldberg et al. | 248/278 |
| 2,712,039 | 6/1955 | Holmes | 248/276 X |
| 3,358,957 | 12/1967 | Lindenmuth | 248/920 X |
| 4,516,751 | 5/1985 | Westbrook | 248/279 X |
| 4,768,744 | 9/1988 | Leeds et al. | 248/921 X |
| 5,076,524 | 12/1991 | Reh et al. | |
| 5,092,552 | 3/1992 | Dayton et al. | 248/231.7 X |
| 5,123,621 | 6/1992 | Gates | 248/920 X |
| 5,177,616 | 1/1993 | Riday | |
| 5,179,447 | 1/1993 | Lain | |
| 5,195,709 | 3/1993 | Yasushi | |
| 5,222,780 | 6/1993 | Reh et al. | |
| 5,277,392 | 1/1994 | Rossman et al. | 248/231.7 |
| 5,374,104 | 12/1994 | Moore et al. | 248/293 X |

FOREIGN PATENT DOCUMENTS

| 2222939 | 3/1990 | United Kingdom | 248/278 |
|---|---|---|---|
| PCT/JP90/ 00180 | 9/1990 | WIPO | |

*Primary Examiner*—Ramon O. Ramirez
*Attorney, Agent, or Firm*—Kolisch, Hartwell, Dickinson, McCormack & Heuser

[57] ABSTRACT

A ratcheting articulable monitor support system accommodates storage and presentation of an associated monitor, and is usable with a base and a monitor-mounting member. The system includes an arm with a first end and second end, wherein the first end is pivotally mounted to the base allowing rotational movement of the arm about a first axis and in a first plane. The arm has a range of rotational motion as a result of the pivotal mounting, and that range is characterized as having an arm-rotational-movement-restricting subrange. The system also includes a ratchet member fixedly attached to the arm intermediate the first and second ends, which ratchet member includes a body with a first subregion having arm-rotational-movement-restricting structure. A detent member is also included adjacent the ratchet member and fixedly attached to the arm intermediate the first and second ends. The detent member includes an operative end that is movable to engage the arm-rotational-movement-restricting structure of the ratchet member, and such engagement occurs when the arm is rotated in the arm-rotational-movement-restricting subrange. There is also a monitor support system that allows four degrees of movement within the system.

13 Claims, 6 Drawing Sheets

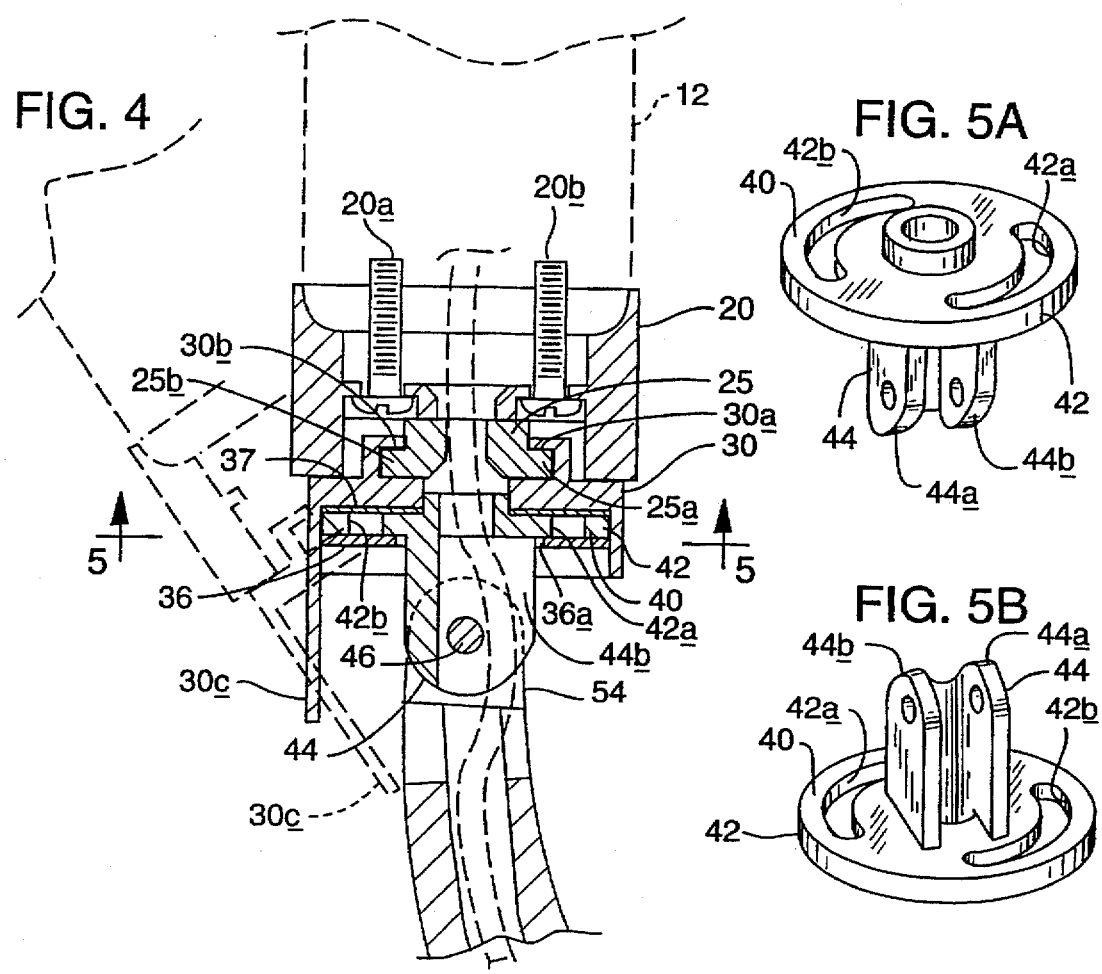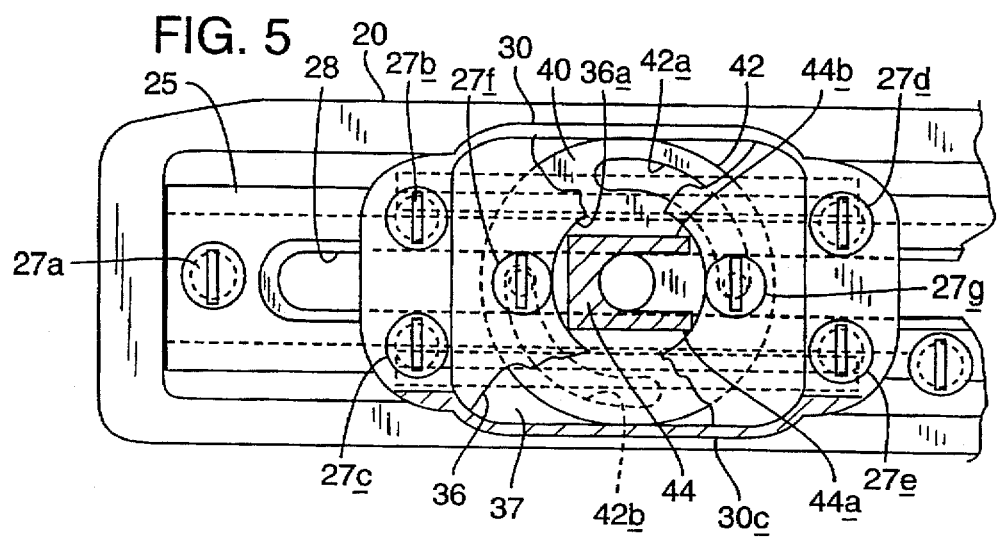

RATCHETING ARTICULABLE MONITOR SUPPORT AND PRESENTATION DEVICE

BACKGROUND AND SUMMARY OF THE INVENTION

The present invention relates generally to an monitor support apparatus and, more particularly, to a ratcheting articulable monitor support and presentation device which may be articulated relative to a seat having an arm rest, which device is stowable within the arm rest of the seat.

It is known to construct a seat with a device that may be stowed within it when not in use, and which may be accessed by a user for use. Such a device may be a television screen, a computer screen, or other interactive devices. The utility of such a display is especially recognized in environments such as airplanes, buses, or terminal areas. This is because people in these environments must often wait or remain stationary for long periods of time. Such devices offer entertainment/ distraction for such people.

Due to space constraints in such areas, efficient storage of the devices is necessary. Additionally, when individuals travel via an airplane or bus, such devices are provided to provide them with entertainment or to allow them to work. For instance, a television monitor may be utilized to display a movie or some other form of media entertainment. Alternatively, the display may come in the form of a computer screen readily connected to a computer thereby enabling a user to work while traveling. Such a device, because of the close proximity of the seating, must be stowable during ingress and egress so that it does not interfere with passenger movement. Moreover, when a passenger takes a seat, the device should be accessible in an ergonomically advantageous way.

Safety is also of utmost importance when such a device is being used by a passenger when a vehicle is in transit. Sudden stops or starts could cause such a device to fly out of control and injure passengers.

Although a number of articulable monitor supports are known in the prior art, such supports are unsatisfactory due to their failure fully to address and satisfy all of the concerns listed above.

One such prior art proposal is found in U.S. Pat. No. 5,177,616 entitled "STOWABLE VIDEO DISPLAY ASSEMBLY" to Riday. Riday discloses a video display assembly having a video display connected to an airline seat via an arm. The arm is pivotable out of a cavity in the armrest from a stowed position to various other positions: (1) an intermediate position in which the monitor is viewed edgewise by the user, (2) an operating position in which the monitor faces the user, and (3) a "breakover orientation" in which a sudden force overcomes the monitor and it pivots away from the user.

The monitor in Riday is unsatisfactory ergonomically because it lacks necessary adjustability in multiple planes. Moreover, the safety mechanism disclosed by Riday for allowing the monitor safely to pivot out of the way is cumbersome to assemble and may become loose during relatively rough vehicular transit. Such loosening would present an unsafe condition, or an inoperable device.

Another attempt in the prior art is shown in U.S. Pat. No. 5,179,447 to Lain and entitled, "PERSONAL VIDEO PLAYER AND MONITOR ASSEMBLY FOR AIRLINE PASSENGER SEAT CONSOLE". Lain discloses another type of stowable video monitor. The monitor is prevented from moving rearwardly in the event of sudden motion of the aircraft by the console. A spring-biased clutch is connected between the arm and the console to provide resisting torque to movement of the arm and monitor.

Lain is also unsatisfactory ergonomically because it lacks necessary adjustability in multiple planes for allowing proper positioning before users with various sized bodies. Moreover, Lain does not disclose a monitor which collapses rearwardly for stowing in the arm rest. Rather, the console in Lain prevents the rearward movement of the monitor as a safety measure in case of sudden movement of the aircraft. However, that safety measure may increase the chance of the device breaking free from the arm rest in the event of such a sudden movement, thereby possibly causing injury to passengers.

With the above problems and prior art proposals in mind, it is an object of the present invention to provide a stowable articulable monitor support.

It is another object of the invention to provide an articulable monitor support adjustable by the user to multiple positions for satisfying ergonomic requirements.

It is a further object of the invention to provide an articulated monitor support which may be easily pivoted out of the way in the event of an emergency.

It is yet another object of the invention to provide an articulated monitor support which is inexpensive to manufacture, easy to assemble, and safe to use.

In summary, the invention achieves these and other objects in the form of a ratcheting articulable monitor support system that accommodates storage and presentation of an associated monitor, and is usable with a base and a monitor-mounting member. The system includes an arm with a first end and second end, wherein the first end is pivotally mounted to the base allowing rotational movement of the arm about a first axis and in a first plane. The arm has a range of rotational motion as a result of the pivotal mounting, and that range is characterized as having an arm-rotational-movement-restricting subrange. The system also includes a ratchet member fixedly attached to the base, which ratchet member includes a body with a first subregion having arm-rotational-movement-restricting structure.

A detent member is also included adjacent the ratchet member and fixedly attached to the arm intermediate the first and second ends. The detent member includes an operative end that is movable to engage the arm-rotational-movement-restricting structure of the ratchet member, and such engagement occurs when the arm is rotated in the arm-rotational-movement-restricting subrange. There is also a monitor support system that allows four degrees of movement within the system.

These and additional objects and advantages of the present invention will be more readily understood after a consideration of the drawings and the detailed description of the preferred embodiment.

BRIEF DESCRIPTION OF THE DRAWINGS

FIG. 4 is an enlarged side view of the top portion of the monitor support system with sections being removed to illustrate certain construction features.

FIG. 5 is a view along line 5—5 of FIG. 4.

FIGS. 5A–B are enlarged isometric views of the rotation pivot included within the monitor support system.

DETAILED DESCRIPTION OF THE PREFERRED EMBODIMENT

Figure 1:
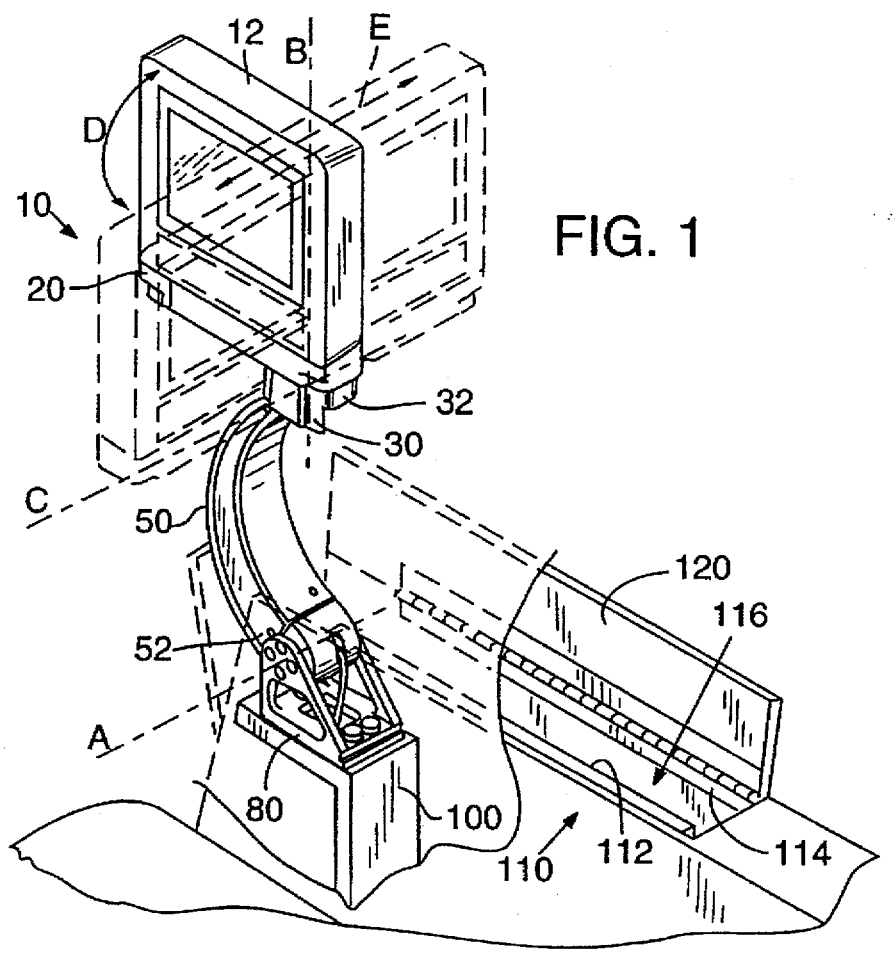
FIG. 1 is an isometric view of an articulable monitor support system constructed according to the preferred embodiment of the present invention, and showing in dashed lines, a monitor rotated for viewing by a user.
Figure 2:
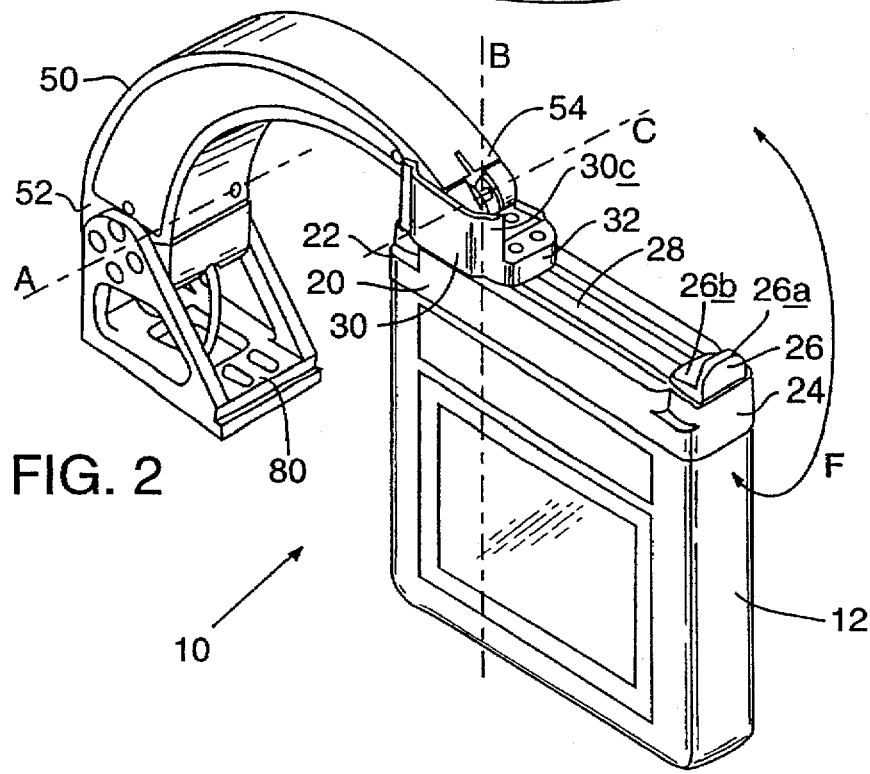
FIG. 2 is an enlarged isometric elevation of the monitor support system, showing the monitor in one stowed position.
Figure 6:
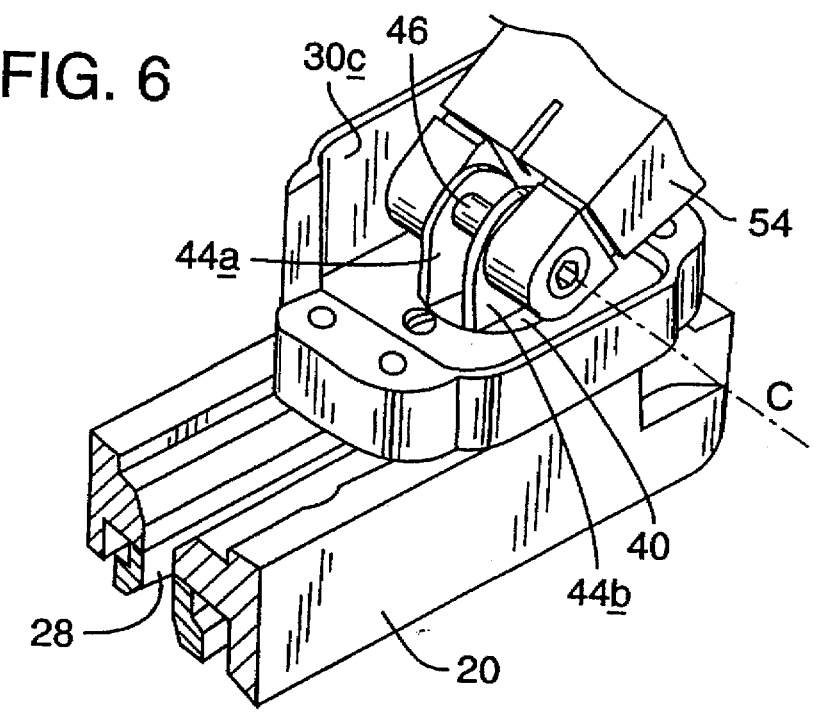
FIG. 6 is an enlarged fragmentary isometric view of the monitor mounting member rotated 90-degrees from the view depicted in FIG. 2.

Referring now to the drawings, and initially to FIGS. 1–2 and 6, the reader will see an articulable monitor support system constructed according to the preferred embodiment of the present invention, and shown generally at 10. Monitor 12 is fixedly attached to a monitor mounting member 15 having a first, a second and a third mounting subelements, 40, 30, and 20 respectively. An elongate arm 50 is provided with a first end 52 and a second end 54. First end 52 is pivotally mounted to base 80 allowing rotational movement of arm 50 about axis A in a first plane. Second end 54 of arm 50 is operatively connected to monitor mounting member 15.

More specifically, and with respect to the connection between second end 54 and monitor mounting member 15, first mounting subelement 40, also referred to as a rotation pivot, is pivotally joined to the second end 54 of arm 50 allowing pivotal movement of the monitor mounting member 15 about axis C in the direction of arrow F with such movement occurring within a second plane. Axis C is generally parallel to axis A.

Second mounting subelement 30, also referred to as a monitor slide, is rotatably joined to first mounting subelement 40 allowing for rotational movement of monitor mounting member 15 in the direction of arrow D about axis B with such movement occurring in a third plane. Axis B is generally orthogonal to axis C.

Third mounting subelement 20, also referred to as a monitor mounting base, is fixedly joined to monitor 12 and is slidably joined to second mounting subelement 30 allowing for sliding movement of the monitor mounting member 15, and hence monitor 12, in the direction of line E wherein line E is generally orthogonal to axis B.

Base 80 is attached to a knee portion 100 within armrest 110. Armrest 110 formed by walls 112 and 114 wherein the walls define a cavity 116. The first plane through which arm 50 may be moved includes a first range and a second range, wherein the first range corresponds to that area inside armrest 110, referred to as cavity 116. The first range includes a transition area to the second range wherein the second range corresponds to that area outside of cavity 116. The first plane and, more specifically, the first and second ranges including the transition area, are set forth more clearly in FIG. 3 and described below.

Figure 3:
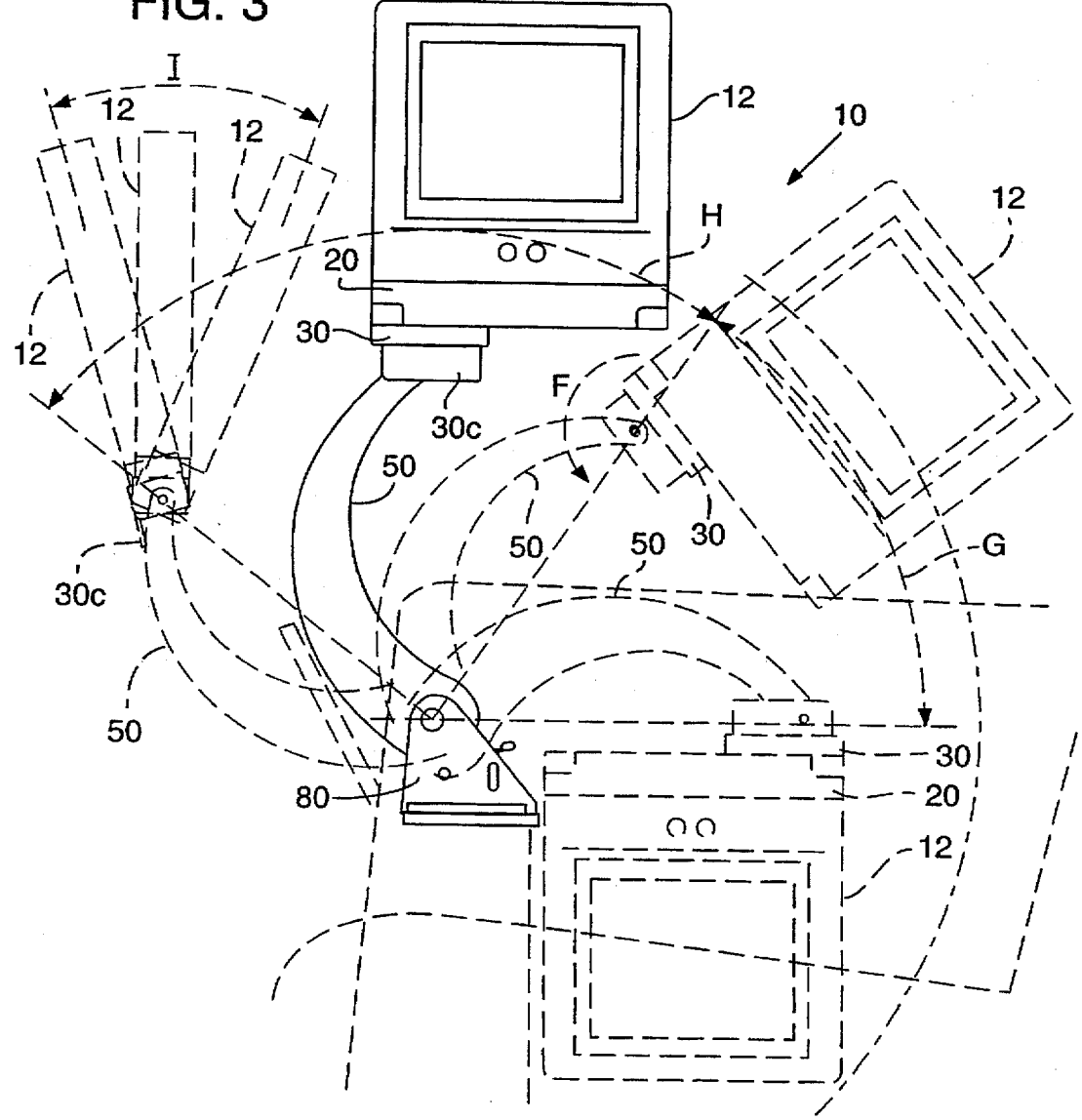
FIG. 3 is a side plan view of the monitor support system depicting the supported monitor in various stages from one stowed position to a presented position.

Referring specifically to FIGS. 2 and 3, monitor mounting member 15 and monitor 12 are shown in an inverted position, such position corresponding to one possible stowed position within cavity 116. Mounting member 15 and more specifically mounting base 20 includes a first end 22 and a second end 24. Mounted adjacent second end 24, a thumb tab 26 is provided with walls 26a and 26b. Slot 28 in the bottom of mounting base 20 extends between first end 22 and second end 24. Mounting base 20 is slidably mounted to monitor slide 30 via slot 28 and may be moved between first and second ends 22 and 24 respectively.

In the preferred embodiment, when monitor 12 via arm 50 is pivoted about axis A to a storage position within cavity 116, the monitor is pivoted in substantially the same orientation relative to arm 50 as is shown in solid lines in FIG. 1. Thus, in the storage position, the monitor would be oriented with thumb tab 26 near the top of cavity 116. When so oriented, the monitor may be accessed and rotated about axis A for presentation to the user by applying the necessary force to thumb tab 26, in a direction away from arm 50, and pivoting the same for presentation. It should be appreciated that monitor 12 may be spring-loaded so that upon opening lid 120 on armrest 110, monitor 12 would spring from cavity 116 so that the same could be accessed by a user. Thus, it is contemplated that there are a number of ways of accommodating access to the monitor 12 which are within the spirit and scope of the invention.

Referring now to FIGS. 1–3, device 10 is shown in FIG. 3 in four positions. In the first position, device 10 is stowed with monitor 12 in cavity 116 in armrest 110. The first position, or stage, shows an alternative embodiment wherein monitor 12 may be partially rotated about axis C for even more compact storing. In the second and third stages, the device is shown in various intermediate positions. In the second stage, the device has been moved from the stowed position through the range defined by arrow G. Monitor 12 has been rotated about axis C in the direction of arrow F to enable the presentation of the monitor. In the third stage, arm 50 has been extended through the range defined by arrow H terminating in the forth stage wherein the monitor is presented for viewing by the user, monitor 12 having been rotated 90° about axis B in the direction of arrow D in FIG. 1 to present the monitor screen.

Monitor 12 may, in the presented position, be tilted about axis C through a range defined by arrow I in FIG. 3. A downwardly depending skirt 30c acts as a tilt break, or stop, by preventing the over-tilting of the monitor about axis C. The way in which monitor 12 and mounting member 15 may be moved relative to arm 50 may be more easily understood with reference to FIGS. 4–6 and the discussion directly below.

Referring now to FIGS. 4–6, monitor 12 is shown in phantom, dashed lines being depicted in its mounted position on mounting member 15. Monitor 12 is fixedly mounted to mounting base 20 via mounting base screws 20a and 20b received in corresponding screw bores in the bottom portion of the monitor. A slide track 25 is mounted within mounting base 20 via screws passing through screw bores 27 in slide track 25 and anchoring slide track 25 to mounting base 20. Slide track 25, when so mounted, has two outwardly extending shoulder portions 25a and 25b which define a track space between slide track 25 and mounting base 20. Sliding tension is regulated by tightening screws 27b–e.

Mounting base 20 and slide track 25 are slidably mounted to monitor slide 30. Monitor slide 30 includes two inwardly projecting shoulder portions 30a and 30b, which portions mate with the outwardly extending shoulder portions 25a and 25b on slide track 25. As noted above, monitor slide 30 includes a downwardly depending skirt 30c.

A rotation pivot 40 includes a circular base portion 42 having formed therein two opposed arcuate slots 42a and 42b. A U-shaped saddle 44 is joined to base portion 42 and includes two walls 44a and 44b. Walls 44a and 44b are joined together and define the U-shaped saddled, most easily seen in FIG. 5. Rotation pivot 40 is mounted between second end 54 of arm 50 and monitor slide 30. More specifically, a first washer 37 having a central bore and two opposed screw bores (not shown) is received by monitor slide 30. Rotation pivot 40 is mounted on first washer 37. Opposed arcuate slots 42a and 42b are aligned with the screw bores on first washer 37. A second washer 36 having a large central bore 36a and opposed screw bores 27f and 27g is placed on top of rotation pivot 40 with saddle 44 passing through central bore 36a. Screws are received in and pass through the screw bores 27f and 27g and define a limit through which rotation pivot 40 may be moved. The screws received in screw bores 27f and 27g may be tightened or loosened to increase or decrease rotational tension.

Although the degree of pivot shown in the figure is limited to 90°, it should be appreciated that arcuate slots 42a and 42b may be actually joined to form a unitary concentric slot in base 42 thereby allowing for full rotation about axis B.

Referring to FIG. 6, rotation pivot 40 is rotatably mounted to second end 54 of arm 50. Walls 44a and 44b include aligned apertures through which a pin 46 may pass. Each end of pin 46 is non-rotatably mounted in a corresponding well (not shown) in the second end 54 of arm 50. Pin 46 may be in the form of a screw received in a shaft which screw may be adjusted to increase or decrease the friction between the second end 54 of arm 50 and walls 44a and 44b thereby increasing or decreasing the monitor's tilt tension.

Skirt 30c on monitor slide 30 acts as a tilt break when monitor 12 is in the presented position and tilted about axis C as shown in FIGS. 2 and 3. When the monitor is in the presented position, the monitor's screen is substantially facing the user. That is, in the presented position, the monitor has been rotated about axis B as shown in FIG. 2, from an intermediate position, to a position wherein the user may see and use the screen. The user may however desire to tilt the monitor relative to arm 50 for better viewing. When so tilted about axis C, skirt 30c will eventually come in to abutting contact with arm 50, as shown in phantom in FIG. 4. This abutment will ensure that the monitor is not over-tilted.

Figure 9:
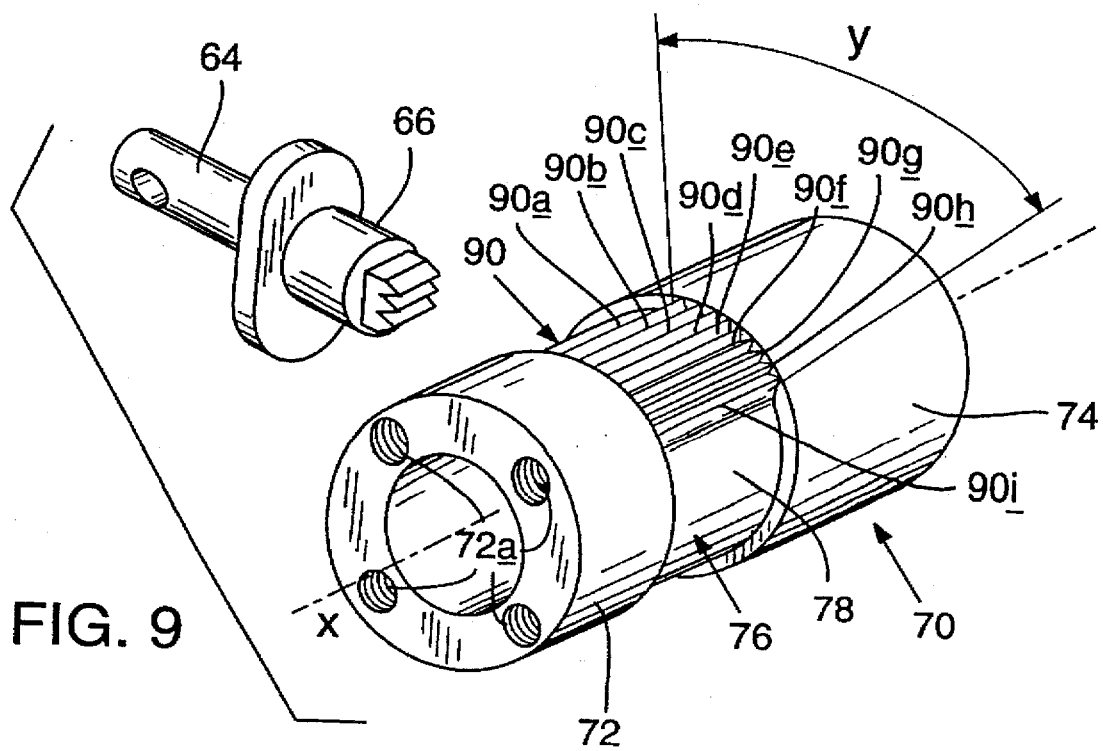
FIG. 9 is an enlarged isometric elevation of the detent member and ratchet member.
Figure 7:
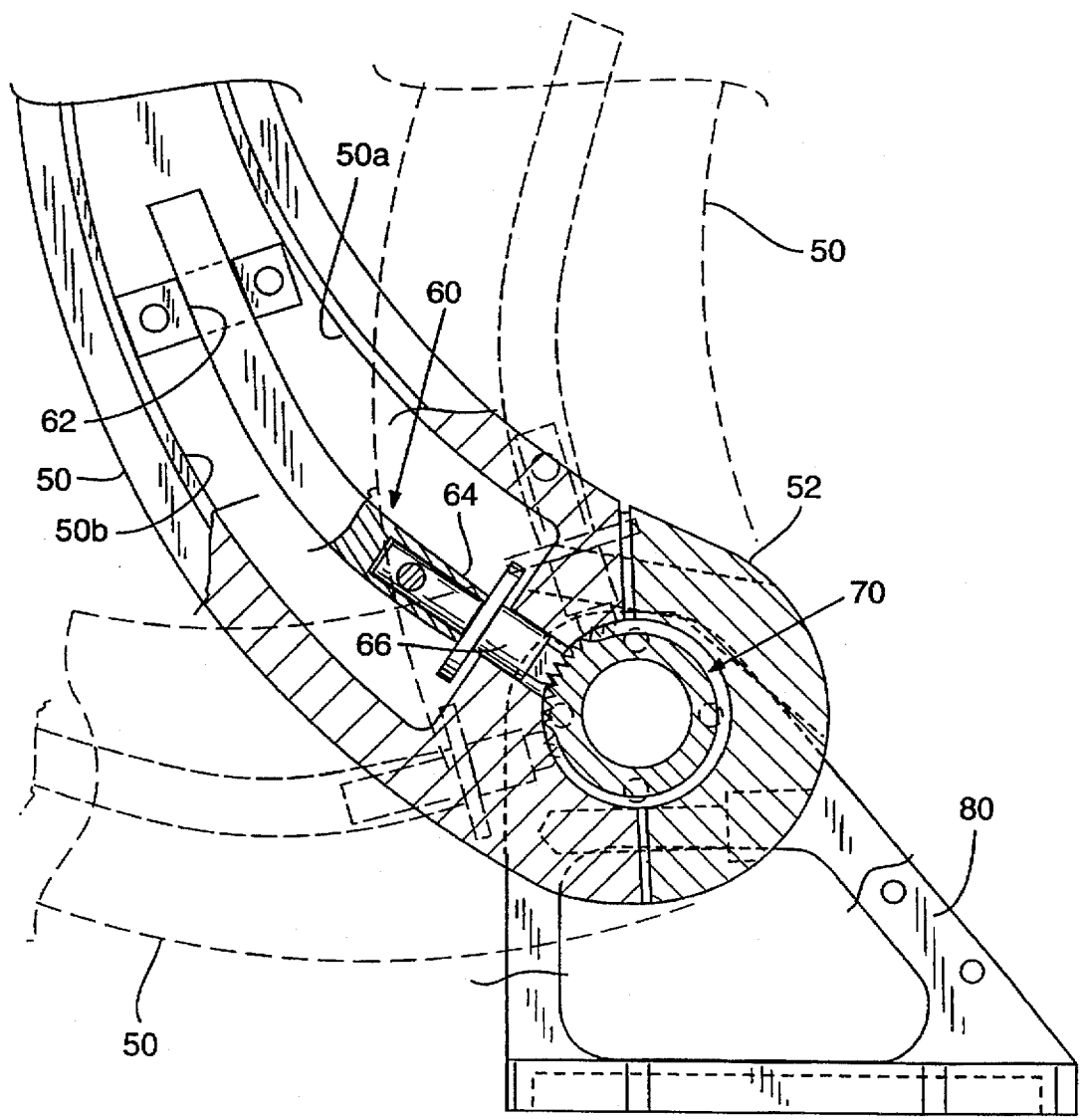
FIG. 7 is an enlarged fragmentary side-sectional view of the second end of the arm adjacent the base, showing articulations of the arm.
Figure 8:
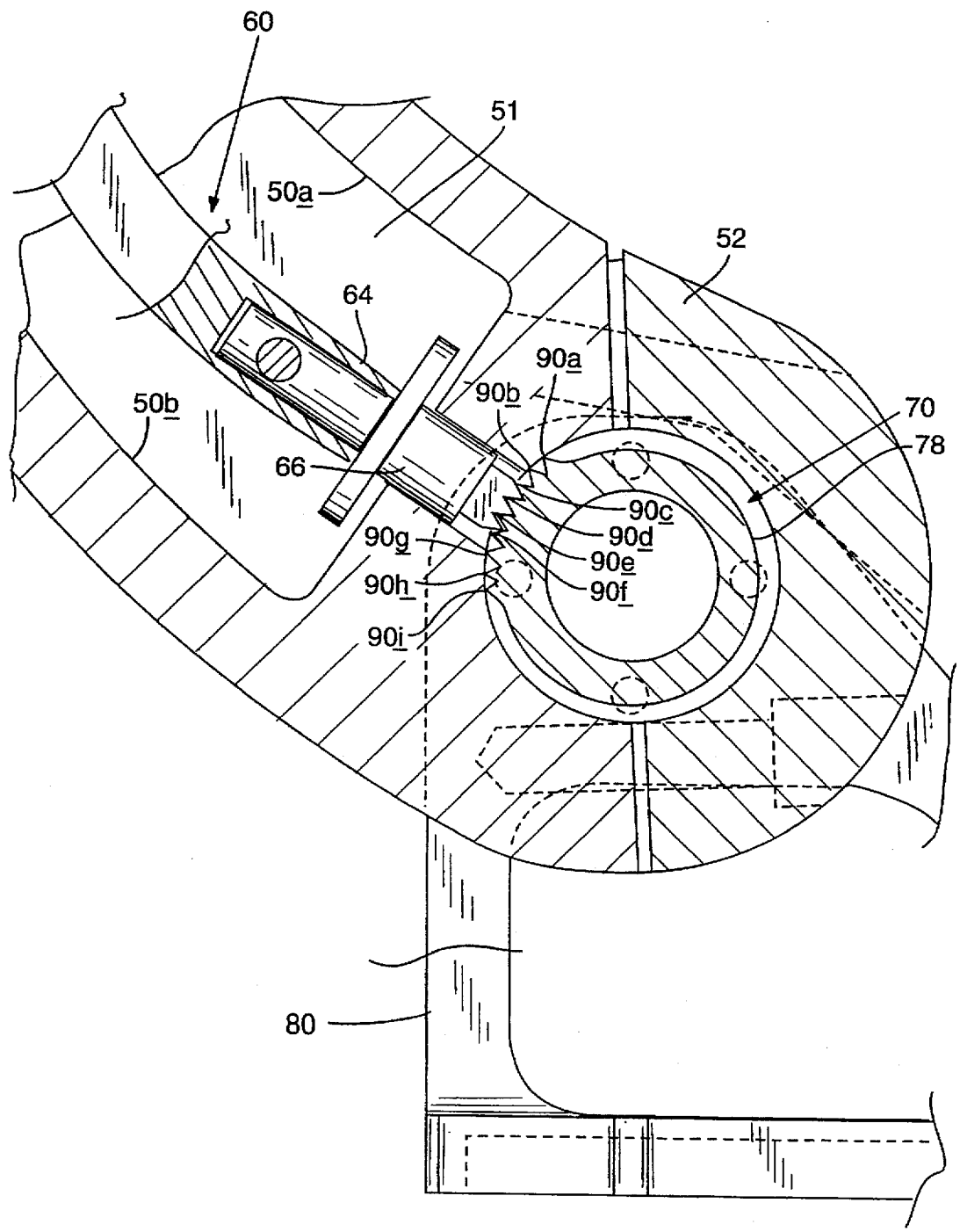
FIG. 8 is an enlarged view of FIG. 7.

Referring now to FIGS. 7–9, arm 50 includes wall portions 50a and 50b defining a cavity extending between first and second ends 52 and 54 respectively. A ratchet member 70 in the form of a wheel or cylindrical member is provided with end portions 72 and 74. Ratchet member 70 is nonrotatably mounted to base 80 (its preferred mounting) within arm 50 at first end 52 via screws received threaded screw bores 72a. Member 70 includes a body 76 in the form of a central hub 78 with a first subregion (Y in FIG. 9), wherein the subregion includes arm-rotational-movement-restricting structure in the form of toothed portion 90. Toothed portion 90, spanning a range of the periphery defined by arrow Y, includes individual inclined teeth 90a–i. Plural inclined teeth 90a–i are radially offset from one another about the periphery of hub 76 with each individual tooth defining plural planes wherein each of the planes is generally parallel to the long axis X of the ratchet member.

A detent member 60 is positioned adjacent ratchet member 70 and is fixedly attached to arm 50 at end 64, intermediate the first and second ends of arm 50. Detent member 60 includes an operative end 66 which is movable to engage plural inclined teeth 90a–i of ratchet member 70. Such engagement corresponds to when arm 50 is rotated in the arm-rotational-movement-restricting subrange. Operative end 66 of detent member 60 may be seen in the form of a biased pawl having teeth therein, wherein the pawl is biased toward ratchet member 70 and is selectively engagable with plural teeth 90a–i on ratchet member 70. Pawl 66 may be spring biased.

It should be appreciated that the arm-rotational-movement-restricting subrange discussed above in relation to the specific structure described, should not be seen to limit the invention insofar as any number of frictional surfaces could equally be employed to effect the same subrange characteristics, and such surfaces are within the spirit and scope of the invention.

Although a preferred embodiment of the invention has been described herein, it should be appreciated that variations and modifications may be made thereto without departing from the scope of the claims.

I claim:

1. A ratcheting articulable monitor support system accommodating storage and presentation of an associated monitor, the support system being usable with a stationary base and a monitor-mounting member, the support system comprising:

an arm having a first end and a second end, wherein the first end is pivotally mounted to the stationary base allowing rotational movement of the arm about a first axis and in a first plane with a range of rotational motion characterized as having an arm-rotational-movement-restricting subrange, the range of rotational motion resulting from pivotally mounting the first end of the arm to the stationary base;

a non-rotatable ratchet member fixedly attached to the stationary base and including a body with a first subregion having arm-rotational-movement-restricting structure; and a detent member being positioned adjacent the ratchet member and being fixedly attached to the arm intermediate the first and second ends, the detent member including an operative end that is movable to engage the arm-rotational-movement-restricting structure of the ratchet member when the arm is rotated in the arm-rotational-movement-restricting subrange.

2. The monitor support system of claim 1 wherein the ratchet member comprises a wheel having circumferentially disposed teeth located thereon, and with the teeth being located on only a perimetral subsection of the wheel.

3. The monitor support system of claim 1 wherein the ratchet member comprises an elongate cylindrical member having inclined teeth radially offset from one another located about the periphery of the cylindrical member, and wherein each tooth defines plural planes wherein each of the planes is generally parallel to the long axis of the cylindrical member and wherein the inclined teeth are disposed on only a portion of the periphery of the member.

4. The monitor support system of claim 2 or 3 wherein the operative end of the detent member comprises a biased pawl, wherein the pawl is biased to move the pawl toward the ratchet member, and wherein the pawl is engagable with the teeth of the ratchet wheel.

5. A ratcheting articulable monitor support system accommodating storage and presentation of an associated monitor, the support system comprising:

a stationary base;

an arm having a first end and a second end, wherein the first end is pivotally mounted to the stationary base allowing rotational movement of the arm about a first axis and in a first plane with a range of rotational motion characterized as having an arm-rotational-movement-restricting subrange, the range of rotational motion resulting from pivotally mounting the first end of the arm to the stationary base;

a monitor-mounting member pivotally joined to the second end of the arm, allowing rotational movement of the monitor-mounting member about a second axis, such movement defining a second plane;

a ratchet member fixedly attached to the stationary base and including a body with a first subregion having arm-rotational-movement-restricting structure; and a detent member being positioned adjacent the ratchet member and being fixedly attached to the arm intermediate the first and second ends, the detent member including an operative end that is movable to engage the arm-rotational-movement-restricting structure of the ratchet member when the arm is rotated in the arm-rotational-movement-restricting subrange.

6. The monitor support system of claim 5 wherein the first and second planes are generally orthogonal to one another.

7. The monitor support system of claim 6 further including the monitor.

8. An articulable monitor support system accommodating storage and presentation of an associated monitor, the support system being usable with a base, the support system comprising:

an arm having a first end and second end, the first end being pivotally mounted to the base, allowing rotational movement of the arm about a first axis and in a first plane; and a monitor-mounting member interposing the arm and the associated monitor, the monitor-mounting member having a first, second, and third mounting subelements which allow four degrees of movement within the system;

the first mounting subelement being pivotally joined to the second end of the arm allowing pivotal movement of the monitor mounting member about a second axis and in a second plane wherein the second axis is generally parallel to the first axis;

the second mounting subelement being rotatably joined to the first mounting subelement allowing for rotational movement of the monitor mounting member about a third axis and in a third plane, wherein the third axis is generally orthogonal to the second axis and the second mounting subelement includes a skirt portion for restricting rotation about the third axis; and the third mounting subelement being fixedly joined to the monitor, and is slidably joined to the second mounting subelement allowing for sliding movement of the monitor mounting member in a linear direction that is generally orthogonal to the third axis.

9. The monitor support system of claim 8 wherein the arm has a range of rotational motion as a result of pivotally mounting the arm with respect to the base, and with the range being characterized as having an arm-rotational-movement-restricting subrange, and wherein the system further comprises:

a ratchet member fixedly attached to the base and including a body with a first subregion having arm-rotational-movement-restricting structure; and a detent member being positioned adjacent the ratchet member and being fixedly attached to the arm intermediate the first and second ends, the detent member including an operative end that is movable to engage the arm-rotational-movement-restricting structure of the ratchet member when the arm is rotated in the arm-rotational-movement-restricting subrange.

10. The monitor support system of claim 9 wherein the ratchet member comprises a wheel having circumferentially disposed teeth located thereon, and with the teeth being located on only a perimetral subsection of the wheel.

11. The monitor support system of claim 10 wherein the operative end of the detent member comprises a biased pawl, wherein the pawl is biased to move the pawl toward the ratchet member, and wherein the pawl is engagable with the teeth of the ratchet wheel.

12. The monitor support system of claim 9 wherein the ratchet member comprises an elongate cylindrical member having inclined teeth radially offset from one another located about the periphery of the cylindrical member, and wherein each tooth defines plural planes wherein each of the planes is generally parallel to the long axis of the cylindrical member and wherein the inclined teeth are disposed on only a portion of the periphery of the member.

13. The monitor support system of claim 12 wherein the operative end of the detent member comprises a biased pawl, wherein the pawl is biased to move the pawl toward the ratchet member, and wherein the pawl is engagable with the teeth of the ratchet wheel.

* * * * *